Nov. 28, 1967                O. KOELLE               3,354,944
TEMPERATURE CONTROL UNIT FOR MAINTAINING THE TEMPERATURE
OF A LIQUID BATH AT A DETERMINED MAGNITUDE
Filed June 17, 1965

Inventor:
Otto Koelle
by Michael J. Striker
Atty

United States Patent Office 3,354,944
Patented Nov. 28, 1967

3,354,944
TEMPERATURE CONTROL UNIT FOR MAINTAINING THE TEMPERATURE OF A LIQUID BATH AT A DETERMINED MAGNITUDE
Otto Koelle, Melsungen, Germany, assignor to
B. Braun, Melsungen, Germany
Filed June 17, 1965, Ser. No. 464,678
Claims priority, application Germany, June 18, 1964,
B 77,293
7 Claims. (Cl. 165—26)

ABSTRACT OF THE DISCLOSURE

A temperature control unit for maintaining the temperature of electric bath at a uniform and predetermined magnitude. A temperature sensing device is immersed into the liquid bath together with a temperature regulator and an agitator. The temperature sensing device senses when the temperature of the bath is different from the predetermined magnitude, and actuates thereupon, a switching device. The switching device connects the temperature regulator and the agitator, at the same time, to an electrical energy source. As a result, the temperature regulator becomes activated and either heats or cools the bath, as required, to maintain the desired temperature. At the same time, the agitator stirs the bath to assure that the contents of the bath are thoroughly intermixed so as to produce a uniform temperature throughout the bath. The entire temperature control unit may be submerged into the bath, with only an electrical connection protruding through the surface of the bath.

---

The present invention relates to a temperature control unit for maintaining the temperature of a liquid bath at a determined magnitude. More particularly, the invention relates to a temperature control unit for maintaining the temperature of a liquid bath at a determined magnitude when the temperature control unit is immersed in the bath.

It is necessary in many instances such as, for example, in biological and biochemical research or in therapeutics, to maintain the temperature of a bath of liquid, such as water, constant. In such instances, a suspension temperature control device or thermostat is usually utilized. The suspension temperature control device comprises an agitator, a temperature regulator such as a heater or cooler, and a temperature sensor or thermometer, all immersed in the liquid bath and driven by a motor positioned outside the liquid bath. The motor is energized by a source of energy positioned outside the liquid bath. A switch, positioned outside the bath, is connected between the source of energy and the drive motor and controls the operation of the agitator and temperature regulator. The switch is controlled by the temperature sensor. The drive motor and switch are positioned in a housing which is hooked or otherwise suspended from the rim of the container which contains the liquid bath. The rigid couplings and connections from the housing to the immersed components are quite often disruptive influences in the tests undertaken which utilize the bath.

The principal object of the present invention is to provide a new and improved temperature control unit for maintaining the temperature of a liquid bath at a determined magnitude.

An object of the present invention is to provide a temperature control unit of compact size for maintaining the temperature of a liquid bath at a determined magnitude.

Another object of the present invention is to provide a temperature control unit in a single immersed housing for maintaining the temperature of a liquid bath at a determined magnitude.

In accordance with the present invention, a temperature control unit for maintaining the temperature of a liquid bath at a determined magnitude comprises a liquid-tight housing for immersion in a liquid bath. The housing houses temperature control components extending into the liquid bath for maintaining the temperature of the liquid bath at a determined magnitude.

In order that the present invention may be readily carried into effect, it will now be described with reference to the accompanying drawing, wherein.

Figure 1:
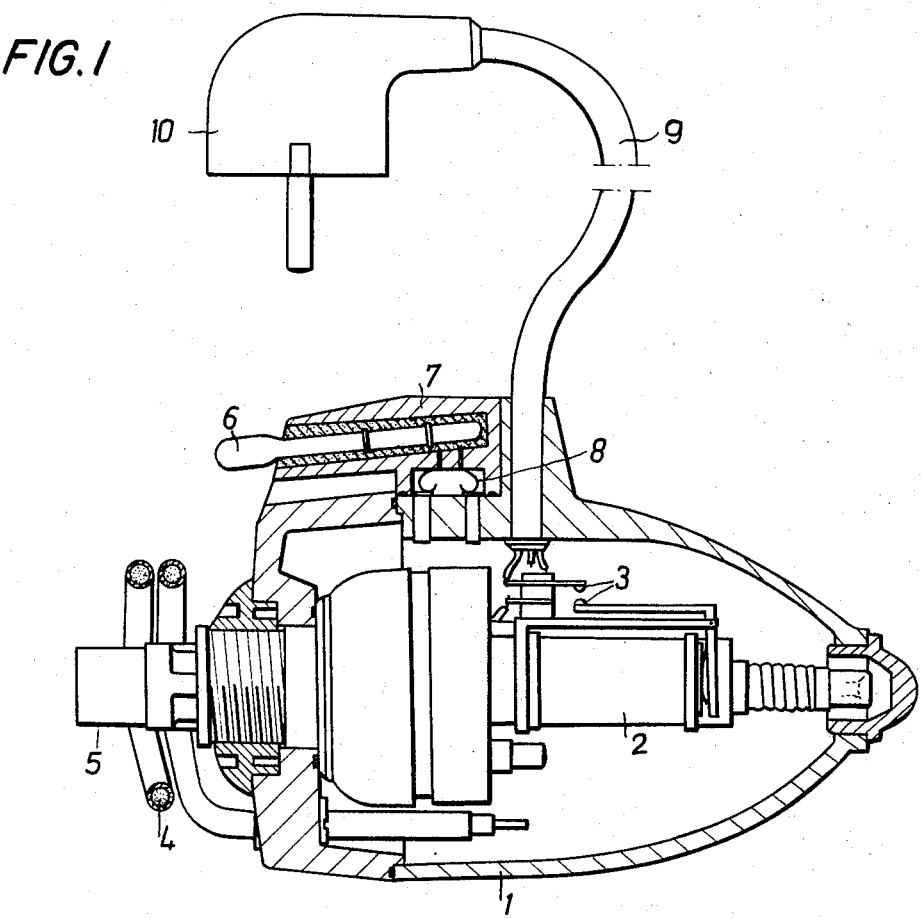
FIG. 1 is a schematic diagram, partly in section, of an embodiment of the temperature control unit of the present invention.

In FIG. 1, a housing 1 is liquid-tight and may be an integral unit or a unit having two halves joined to each other by a liquid-tight seal. The halves of the housing 1 may be threadedly coupled to each other and sealed with a liquid-tight compound. The apertures through which parts of the various components pass through the wall of the housing 1 are sealed with liquid-tight compound. Since such parts do not move or rotate in operation, the housing 1 remains liquid-tight.

The housing 1 is shown in FIG. 1 in section. The housing 1 may comprise any suitable material such as, for example, plastic. A relay 2 is positioned in the housing 1 and operates an armature switch 3 which is also positioned in the housing. The relay switch 3 functions to operate a temperature regulator 4 which is positioned in the housing 1 and extends into the liquid bath. The temperature regulator 4 may comprise any suitable electrically energized heating element for heating the liquid bath or any suitable electrically energized cooling element for cooling the liquid bath. If a heating element is utilized as the temperature regulator 4, such heating element may comprise, for example, an imersion heater with a 300 watt capacity. If a cooling element is utilized as the temperature regulator 4, such cooling element may comprise, for example, Peltier elements or suitable semiconductor elements.

An agitator 5 for agitating the liquid in the bath is positioned in the housing 1 and extends into the liquid bath for providing a uniform temperature distribution throughout said liquid bath. The agitator 5 may comprise any suitable electrically energized agitator such as, for example, a diaphragm pump or a vibration pump or vibrator. The agitator 5 preferably comprises a valveless pump. Although the liquid of the bath may be agitated by a propeller or blades on a shaft driven by the agitator motor, such is not desirable, since the propeller may strike the container containing the liquid bath or the housing 1 or other components in the bath.

A temperature sensor or thermometer 6 is positioned in the housing 1 with its stem bonded in the housing portion 7 and with its bulb extending into the liquid bath. The thermometer 6 may be removably positioned in the housing 1, if desired, by any suitable means such as a liquid-tight packing and is preferably removably positioned. The electrically conductive fluid in the thermometer 6 is in operative proximity with a plurality of electrical contacts 8 and functions to control the energization of the relay 2 in a manner hereinafter explained. The temperature sensor 6 may comprise a contact thermometer with a fixed contact. A thermometer with a fixed contact is preferred because it is of small size.

A source of electrical energy (FIG. 2) may be connected to supply electrical energy to the temperature control components of the housing 1 via an electrical plug 10 and electrical conductors 9.

It is thus seen that the temperature control unit of the present invention is compact and is completely housed in a liquid-tight housing for immersion in the liquid bath. The temperature control unit of the present invention is easily utilized and does not interfere with any test conditions relating to the liquid bath.

Figure 2:
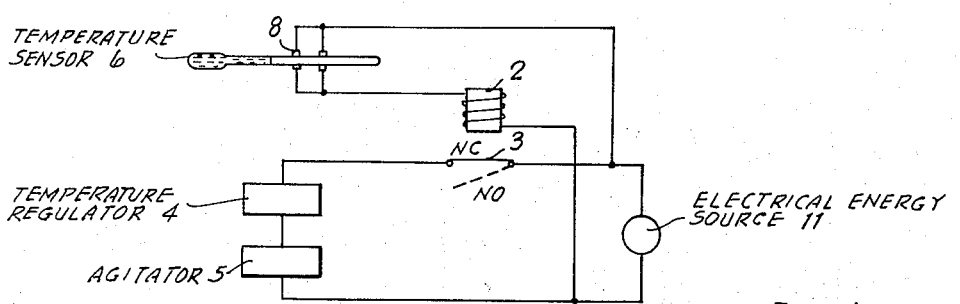
FIG. 2 is a circuit diagram of an embodiment of the temperature control unit of the present invention.

FIG. 2 is a circuit diagram of an embodiment of the temperature control unit of the present invention and illustrates a possible circuit for the connection of the various components of the temperature control unit of the present invention. The contacts 8 of the thermometer 6 are adjusted for the use intended. Thus, for example, if the temperature control unit is to be utilized to heat the liquid bath, the temperature regulator 4 utilized is a heating element, the relay 2 is provided with an armature switch 3 which is normally closed, as shown in a solid line, and the contacts 8 are so positioned that as long as the liquid in the thermometer is below the desired temperature level, the contacts 8 remain open so that the relay 2 remains unenergized and the normally closed switch 3 remains closed. As long as the switch 3 is closed, a source 11 of electrical energy operates the heating element 4 and the agitator 5 to heat the bath liquid. When the temperature of the bath liquid reaches the desired level, the liquid in the thermometer 6 reaches the corresponding temperature level, at which the contacts 8 have been positioned, and such contacts are closed through such thermometer liquid. The closing of the contacts 8 closes the circuit of the relay 2 and energizes said relay so that it opens the normally closed relay switch 3, thereby deenergizing the heating element 4 and the agitator 5.

If the temperature control unit is to be utilized to cool the liquid bath, the temperature regulator 4 utilized is a cooling element, the relay 2 is provided with an armature switch 3 which is normally open, as shown in a broken line, and the contacts 8 are so positioned that as long as the liquid in the thermometer is above the desired temperature level, the contacts 8 remain closed so that the relay 2 is energized and the normally open switch 3 is closed. As long as the switch 3 is closed, the source of electrical energy 11 operates the cooling element 4 and the agitator 5 to cool the bath liquid. When the temperature of the bath liquid drops to the desired level, the liquid in the thermometer 6 drops to the corresponding temperature level, at which the contacts 8 have been positioned, and such contacts are opened as soon as the temperature indication of the thermometer liquid drops the smallest distance below such temperature level. The opening of the contacts 8 opens the circuit of the relay 2 and deenergizes said relay so that the normally open relay switch 3 opens, thereby deenergizing the cooling element 4 and the agitator 5.

While the invention has been described by means of a specific example and in a specific embodiment, I do not wish to be limited thereto, for obvious modifications will occur to those skilled in the art without departing from the spirit and scope of the invention.

What I claim is:

1. A temperature control unit for maintaining the temperature of a liquid bath at a predetermined magnitude, said temperature control unit comprising
   an integrally shaped liquid-tight housing for immersion in a liquid bath; and
   temperature control means positioned in said housing and extending into said liquid bath for maintaining the temperature of said liquid bath at a predetermined magnitude, said temperature control means comprising temperature regulating means for regulating the temperature of said liquid bath, agitating means for agitating said liquid bath to produce uniform temperature throughout said bath, energizing means positioned outside said housing for energizing said temperature regulating and said agitating means, temperature sensing means, and connecting means positioned partly outside said housing connecting said energizing means to said temperature regulating means and to said agitating means via said temperature sensing means, so that when the same senses the temperature of said bath to be different from said predetermined magnitude said energizing means energizes said temperature regulating and said agitating means to produce thereby a liquid bath having a temperature at said predetermined magnitude throughout said bath.

2. A temperature control unit for maintaining the temperature of a liquid bath at a predetermined magnitude, said temperature control unit comprising
   an integrally shaped liquid-tight housing for immersion in a liquid bath; and
   temperature control means positioned in said housing and extending into said liquid bath for maintaining the temperature of said liquid bath at a predetermined magnitude, said temperature control means comprising temperature regulating means for regulating the temperature of said liquid bath, agitating means for agitating said liquid bath to produce uniform temperature throughout said bath, energizing means positioned outside said housing for energizing simultaneously said temperature regulating and said agitating means, switch means, temperature sensing means, and connecting means positioned partly outside said housing connecting said energizing means to said temperature regulating means and to said agitating means via said switch means and connecting said temperature sensing means to said switch means to control said switch means in operation, so that when the same senses the temperature of said bath to be different from said predetermined magnitude said energizing means energizes said temperature regulating and said agitating means to produce thereby a liquid bath having a temperature at said predetermined magnitude throughout said bath.

3. A temperature control unit as claimed in claim 2, wherein said temperature regulating means comprises heating means.

4. A temperature control unit as claimed in claim 2, wherein said temperature regulating means comprises cooling means.

5. A temperature control unit as claimed in claim 2, wherein said temperature regulating means comprises a thermometer having a bulb portion, a stem portion and electrically conductive liquid in said bulb and part of said stem portion, and electrical contact means in operative proximity with the electrically conductive liquid in the stem portion of said thermometer, said electrical contact means being connected by said connecting means to said switch means, said thermometer being positioned with the bulb portion thereof extending into said liquid bath.

6. A temperature control unit as claimed in claim 5, wherein said temperature regulating means is electrically operable, said agitator is electrically operable, said energizing means comprises a source of electrical energy and said connecting means comprises electrical conducting means.

7. A temperature control unit as claimed in claim 6, wherein said switch means comprises relay means.

References Cited

UNITED STATES PATENTS

| | | | |
|---|---|---|---|
| 1,992,988 | 3/1935 | Blahnek | 165—109 |
| 2,266,985 | 12/1941 | Morgan et al. | 219—331 |
| 2,787,444 | 4/1957 | Skarstrom | 165—109 |
| 2,888,547 | 5/1959 | Saper | 219—523 |

ROBERT A. O'LEARY, *Primary Examiner.*

CHARLES SUKALO, *Examiner.*